(12) United States Patent
Tessnow

(10) Patent No.: US 7,375,382 B2
(45) Date of Patent: May 20, 2008

(54) DIRECT OPTICAL LIGHT GUIDE

(75) Inventor: Thomas Tessnow, Weare, NH (US)

(73) Assignee: Osram Sylvania, Inc., Danvers, MA (US)

( * ) Notice: Subject to any disclaimer, the term of this patent is extended or adjusted under 35 U.S.C. 154(b) by 32 days.

(21) Appl. No.: 11/447,214

(22) Filed: Jun. 5, 2006

(65) Prior Publication Data

US 2006/0291249 A1    Dec. 28, 2006

Related U.S. Application Data

(60) Provisional application No. 60/693,999, filed on Jun. 24, 2005, provisional application No. 60/693,262, filed on Jun. 23, 2005.

(51) Int. Cl.
*H01L 33/00* (2006.01)
*F21V 9/00* (2006.01)

(52) U.S. Cl. .................. 257/98; 257/99; 257/E33.067; 257/E33.072; 362/507; 362/511; 362/514

(58) Field of Classification Search .......... 257/98–100, 257/E33.067, E33.072, E33.073, E33.074; 362/559, 560, 613, 615, 616, 623, 625, 628, 362/507, 511, 512, 514

See application file for complete search history.

(56) References Cited

U.S. PATENT DOCUMENTS

| | | | |
|---|---|---|---|
| 6,926,432 B2* | 8/2005 | Rodriguez Barros et al. | 362/494 |
| 2002/0136027 A1* | 9/2002 | Hansler et al. | 362/559 |
| 2007/0139946 A1 | 6/2007 | Basile | |

* cited by examiner

*Primary Examiner*—Minh-Loan T Tran
(74) *Attorney, Agent, or Firm*—William E. Meyer

(57) ABSTRACT

An optical light guide has a substantially rigid light transmissive body having an input window, a distal end, a front side, and a rear side. The light transmissive body has a substantially smooth exterior surface on the front side and a substantially clear and solid interior. The input window transmits light into the light transmissive body and extends substantially transverse to a longitudinal axis of a light emitting diode (LED) light source. The light transmissive body has a substantially constant thickness measured between the front side and the rear side. The light transmissive body extends away from the input window through an arc of from 60 to 120 degrees to an extension that forms an output region extending towards the distal end. The rear side, at least in said output region, is formed with a plurality of totally internally reflective steps directing intercepted light towards the front side.

9 Claims, 6 Drawing Sheets

DIRECT OPTICAL LIGHT GUIDE

CROSS-REFERENCE TO RELATED APPLICATIONS

This application claims priority from Provisional Application Ser. No. 60/693,262 filed Jun. 23, 2005 for REPLACEABLE VEHICLE LAMP WITH LED LIGHT SOURCES and 60/693,999, filed Jun. 24, 2005 for DIRECT OPTICAL LIGHT GUIDE.

TECHNICAL FIELD

The invention relates to optical light guides and more particularly to an optical light guide for use in a vehicle lamp assembly using LED light sources.

BACKGROUND ART

It is an industry standard that is treated as a necessity to make light sources as small as possible. This saves material costs, and can improve optical imaging. In competition with these needs, large fields areas may need to be illuminated, and with vehicle illumination, a substantial visual image is need on the surface of the vehicle to mark the presence of the vehicle. These goals have been met in the past by the use of relatively large incandescent lamp and reflector systems. The advent of solid-state lighting has pointed in the direction of improving these systems by drastically reducing the size of the light source; however, there is still a need to spread beam-forming illumination over a broad area to better illuminate the vehicle. It would be an advance in the art if such a system could be provided without the necessity of using a reflector. It would be a further advance in the art to provide a lighting system that can utilize replacement light sources.

DISCLOSURE OF THE INVENTION

These objects are accomplished, in one aspect of the invention, by the provision of an optical light guide comprising: a substantially rigid light transmissive body having an input window, a distal end, a front side, and a rear side; said light transmissive body having a substantially smooth exterior surface on said front side and a substantially clear and solid interior, said input window transmitting light into said light transmissive body and extending substantially transverse to a longitudinal axis of a light emitting diode (LED) light source; said light transmissive body having a substantially constant thickness measured between said front side and said rear side, said light transmissive body extending away from said input window through an arc of from 60 to 120 degrees to an extension forming an output region extending towards said distal end; said rear side, at least in said output region, being formed with a plurality of reflective steps directing intercepted light towards the front side.

Optical light guides formed in accordance with the above description can be permanently mounted in a vehicle and used with replaceable light sources. A wide variety of light output designs is possible to achieve decorative and/or utilitarian responses.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
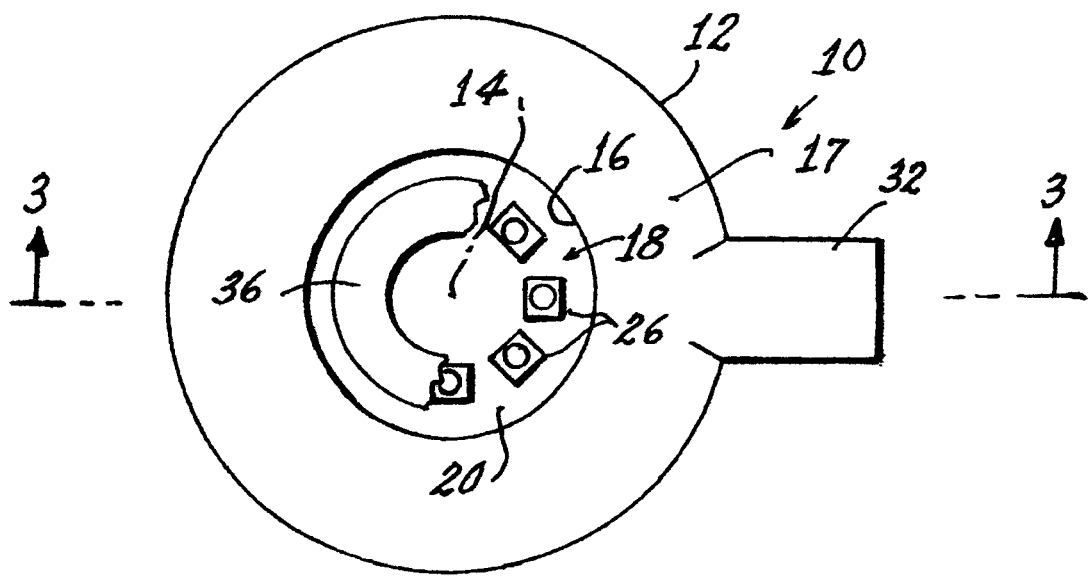
FIG. 1 is plan view of a light source that can be used with the invention.

Referring now to the drawings with greater particularity, there is shown in FIG. 1 a replaceable LED lamp assembly 10 comprising that is ideally suited for use with the optical light guide 100 of this invention. The lamp 10 has a substantially planar housing 12 transversely arrayed about a longitudinal axis 14 and including a through-hole 16 in a first surface 17 thereof. A planar, heat conductive support 18 of a suitable material, such as any metal, with copper or aluminum preferred, or a thermally conductive plastic, is positioned within the housing 12. The planar heat conductive support 18 has a front side 20, a backside 22 and a center point 24 coaxial with the longitudinal axis 14.

Figure 2:
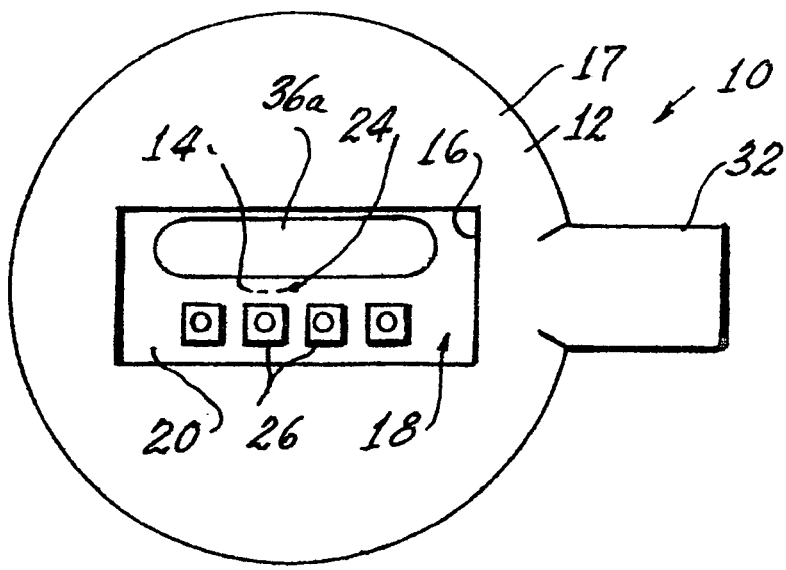
FIG. 2 is a plan view of an alternate light source that can be used with the invention.

LEDs 26 are mounted on the front side 20 and arrayed about the center point 24. In the embodiment shown in FIG. 1 the array is circular and in the embodiment shown in FIG. 2 the array is linear. In a preferred mode there are eight LEDs 26 in each array; however, the actual number will be dependent upon the end use of the light source and, of course, the light output of the individual LEDs.

A base 28 supports the planar, heat conductive support 18 and is fixed to the housing 12 as desired. Preferably, the base 28 is also thermally conductive so that heat generated by the LEDs during operation is passed through the base 28 to the heat sink 30, which is in thermal contact with the base and extends outwardly of the housing. The heat sink 30 can comprise a number of metal rods 30a, the number varying with the size and power of the light source. In a preferred embodiment the light source housing has a diameter of 2.5 inches and there can be about 100 metal rods. The rods preferably have a length of 0.5 inches. If desired, fins can be utilized in place of the rods 30a. A connector 32 is formed with the housing 12 for receiving electrical input to the LEDs and can contain a plurality of electrical contacts, as is known in the art.

The light source 10 described above can be considered to be a complete unit; however, additional modifications can be made to improve its public reception.

For example, couplers 34 can be provided on the surface 17 to ease the mounting requirements when the light source 10 is coupled to a receptive body. In a preferred embodiment the couplers are suitable for rotational coupling.

Figure 3:
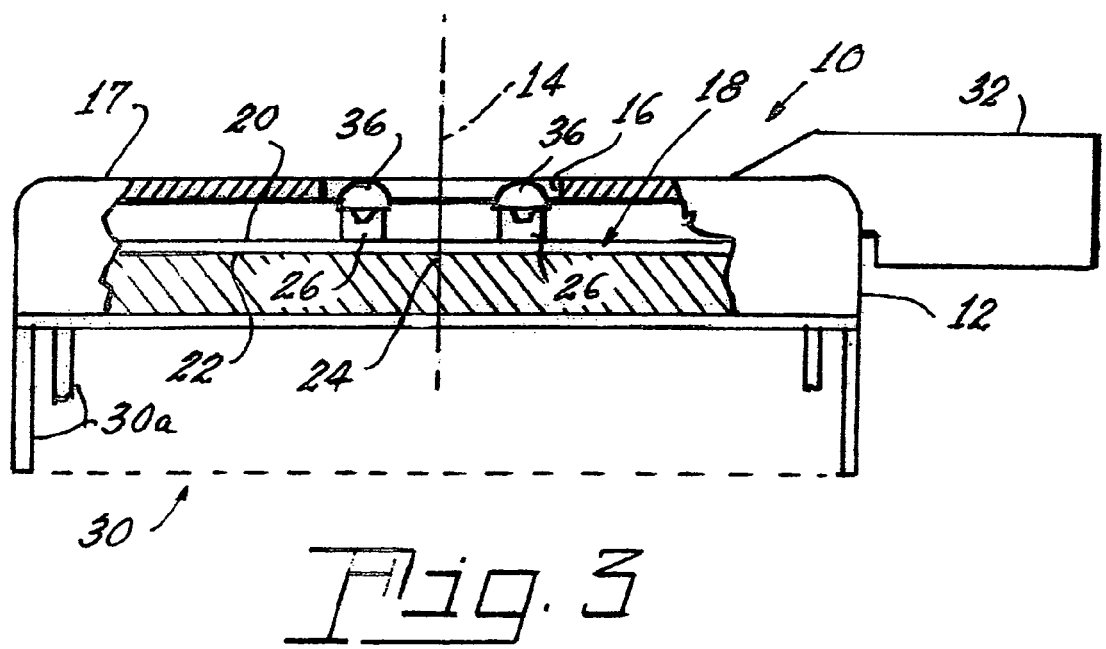
FIG. 3 is a cross-sectional view taken along the line 3-3 of FIG. 1.

Primary optics can be provided. For example, in FIGS. 1, 2 and 3 a primary optic 36 (in the case of the circular array of FIGS. 1 and 3) or 36a (in the case of the linear array of FIG. 2) can be bonded directly to the LEDs 26 by means of optical cement.

Figure 4:
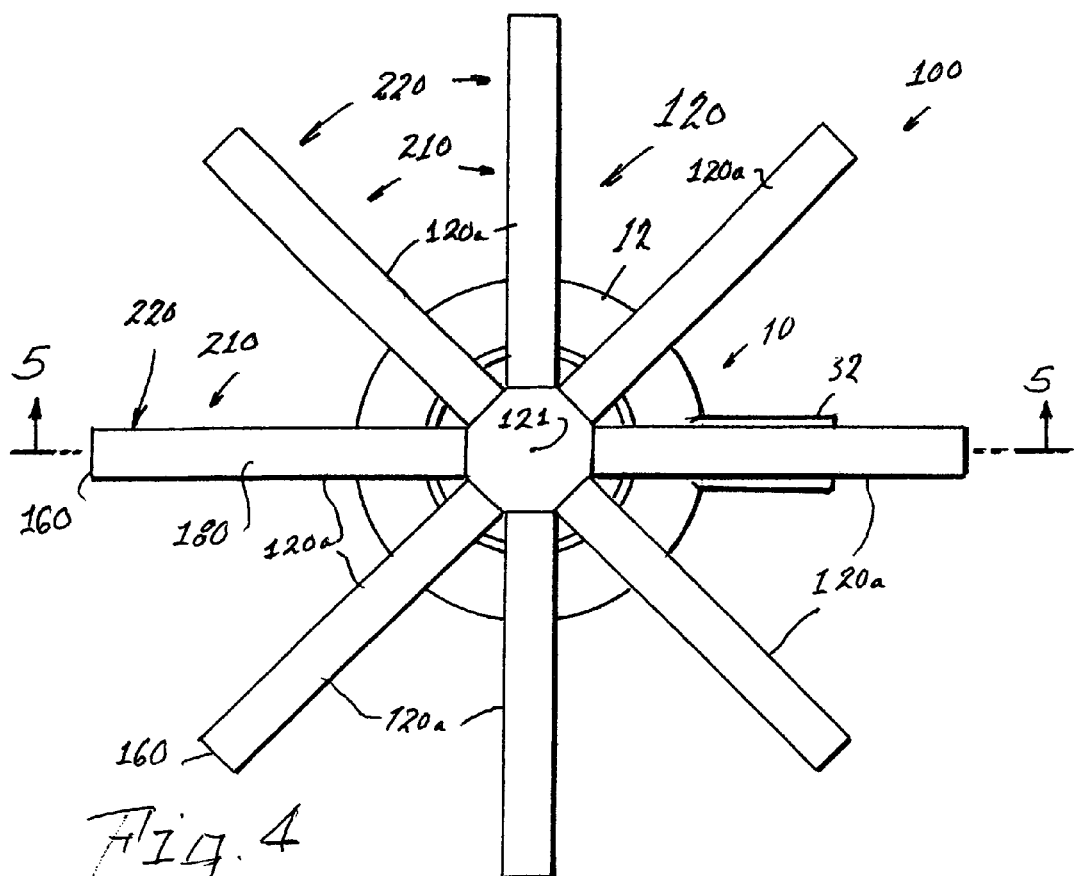
FIG. 4 is a plan view of an embodiment of the invention.

Referring now to FIG. 4, there is shown an optical light guide 100 that can be utilized with the replaceable lamp assembly 10. The light guide 100 comprises a substantially rigid light transmissive body 120 having an input window 140, a distal end 160, a front side 180, and a rear side 200. The light transmissive body 120 has a substantially smooth exterior surface on the front side 180 and a substantially clear and solid interior. A preferred material for the light guide body is a clear plastic, preferably with low transmissions losses such as acrylic; however if mechanical and thermal robustness is more important, polycarbonate is suggested.

The input window 140 transmits light received from the LEDs 26 into the light transmissive body 120 and extends substantially transverse to a longitudinal axis 121 of a light emitting diode (LED) light source 26.

The light transmissive body 120 has a substantially constant thickness measured between the front side 180 and the rear side 200 and extends away from the input window 140 through an arc of from 60 to 120 degrees, with 90° being preferred, to an extension 210 that forms an output region 220 that extends towards the distal end 160.

The rear side 200 at least in the output region 220 is formed with a plurality of reflective steps 240 directing intercepted light towards the front side 180.

Figure 10:
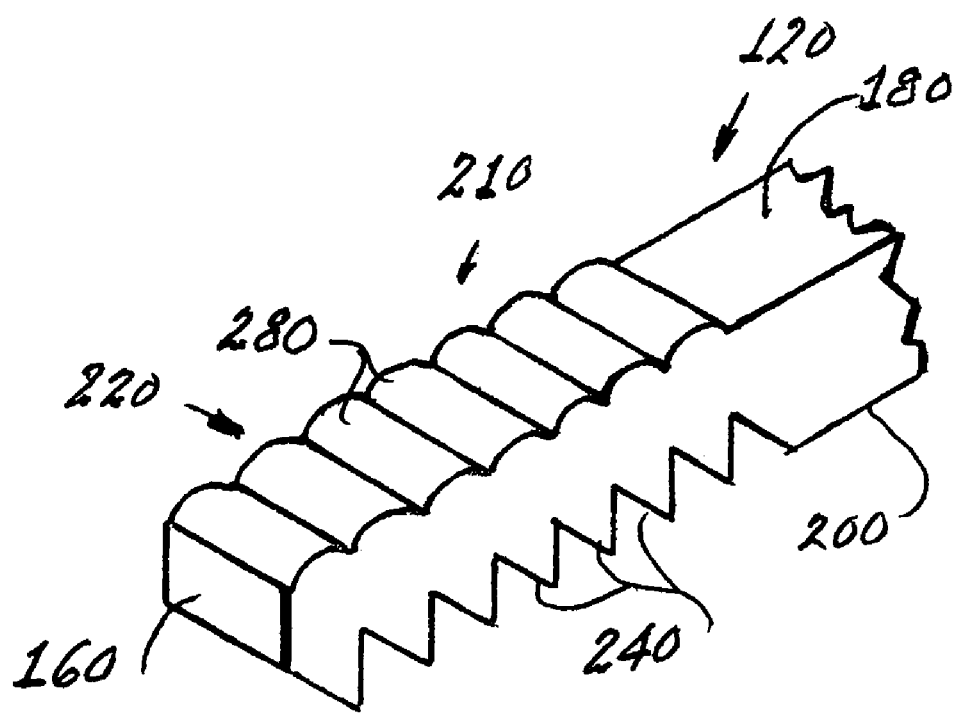
FIG. 10 is a partial perspective view of a light-directing area employable with the optical light guide of the invention.

The front side 180 of the output region 220 can be formed with refractive features 280 directing light received from the reflective steps 240 in a desired direction. In the interest of clarity, the refractive feature 280 is shown only in FIG. 10.

The extension 210 of the output region 220 comprises about one third of the surface distance from the input window 140 to the distal end 160 while the entire length from the input window 140 to the distal end 160 is more than 10 times the average thickness.

Figure 5:
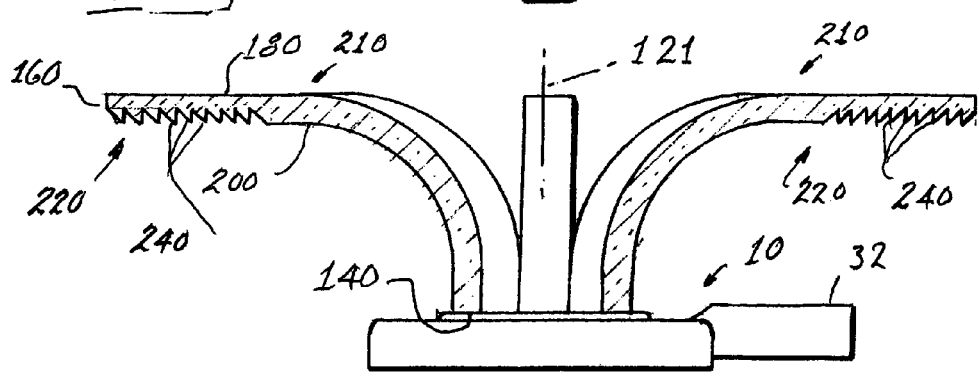
FIG. 5 is a sectional view taken along the line 5-5 of FIG. 4.

In the embodiment shown in FIGS. 4 and 5 the light transmissive body 120 is comprised of a plurality of fingers 120a that are radially arrayed around the longitudinal axis 121. The number of fingers 120a will, of course, correspond to the number and arrangement of LEDs provided in the lamp assembly 10, which in this case is eight LEDs arranged in a circle, as are the LEDs in the lamp assembly 10 of FIG. 1.

Figure 6:
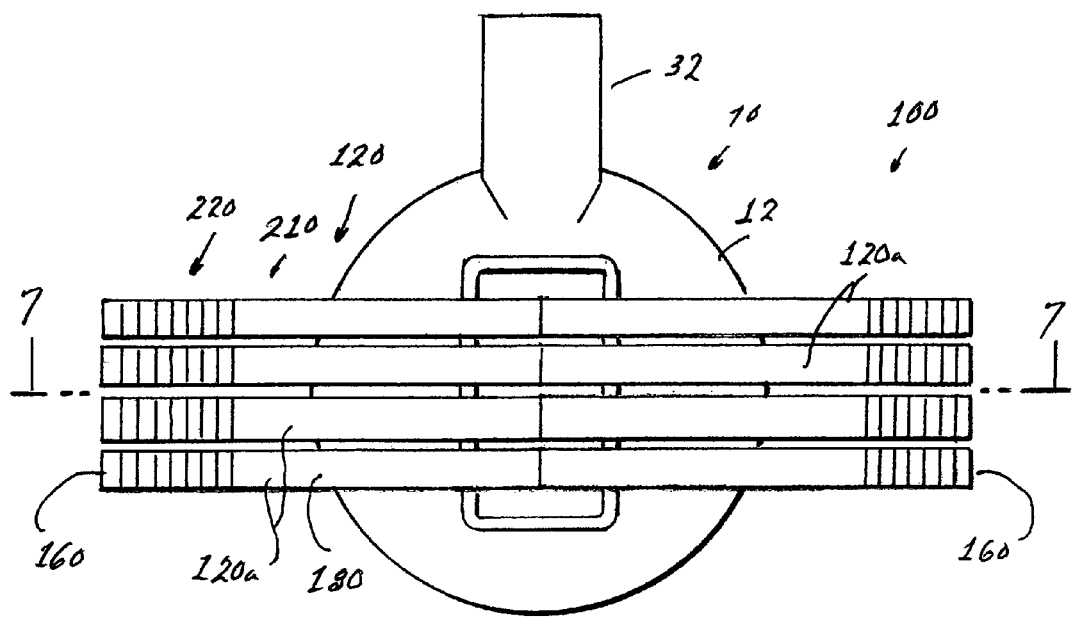
FIG. 6 is a plan view of an alternate embodiment of the invention.
Figure 7:
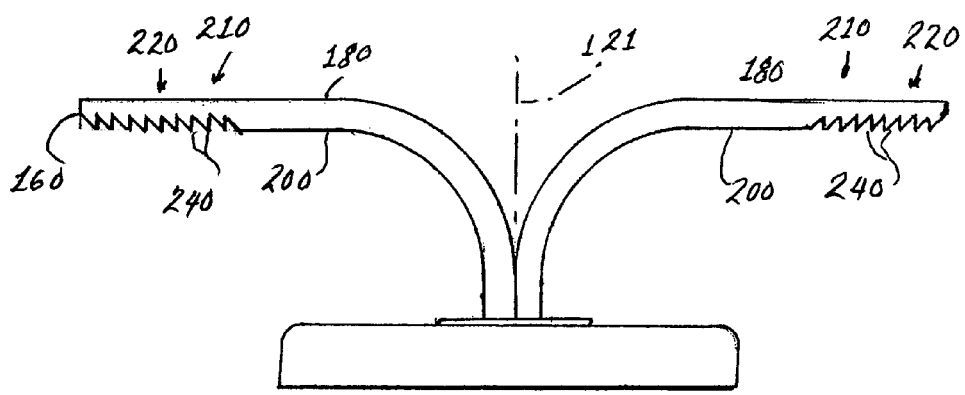
FIG. 7 is a sectional view taken along the line 7-7 of FIG. 6.

Alternatively, the fingers 120a can be arrayed in parallel rows, such as is shown in FIGS. 6 and 7. In this case the optical light guide 100 could be used with the lamp assembly 10 shown in FIG. 2, wherein the LEDs are arrayed in parallel rows.

Figure 8:
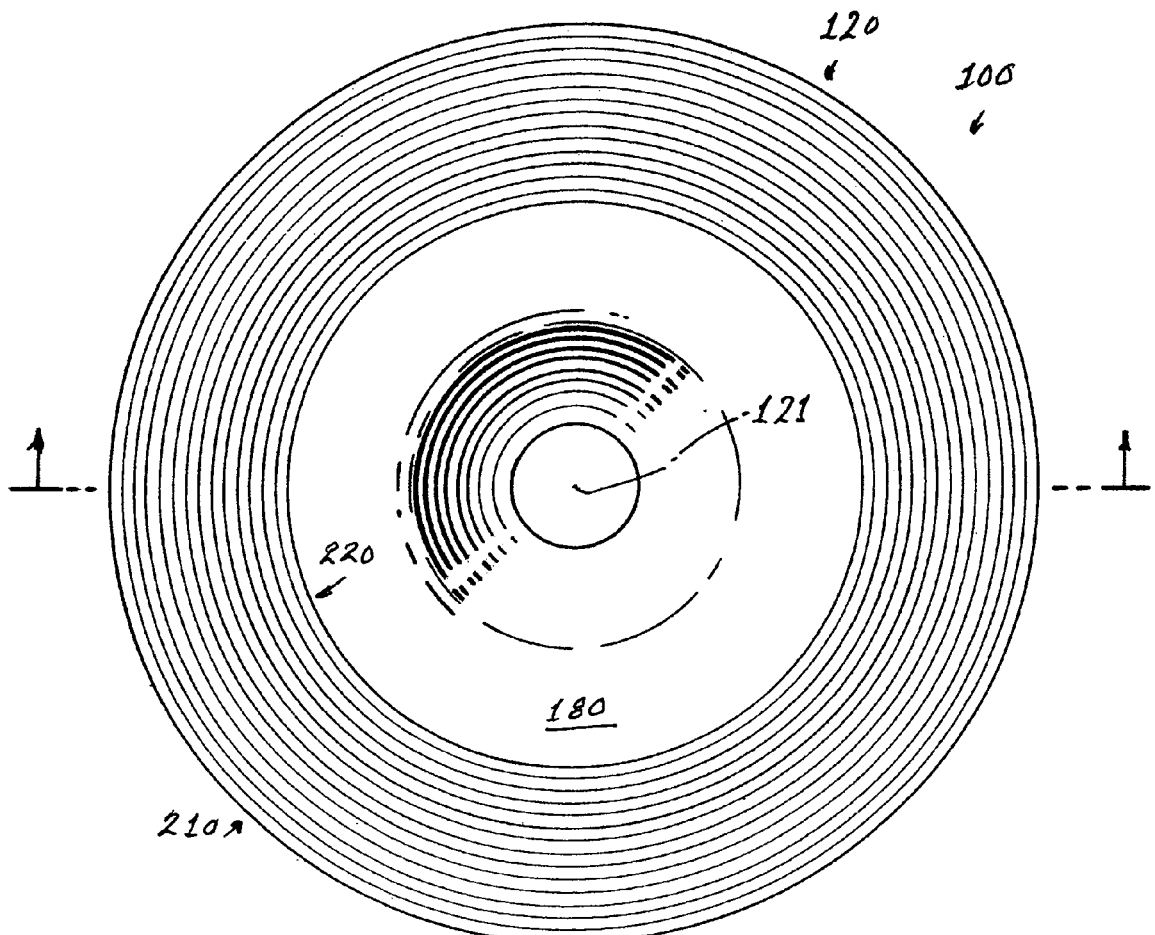
FIG. 8 is a plan view of another alternate embodiment of the invention.
Figure 9:
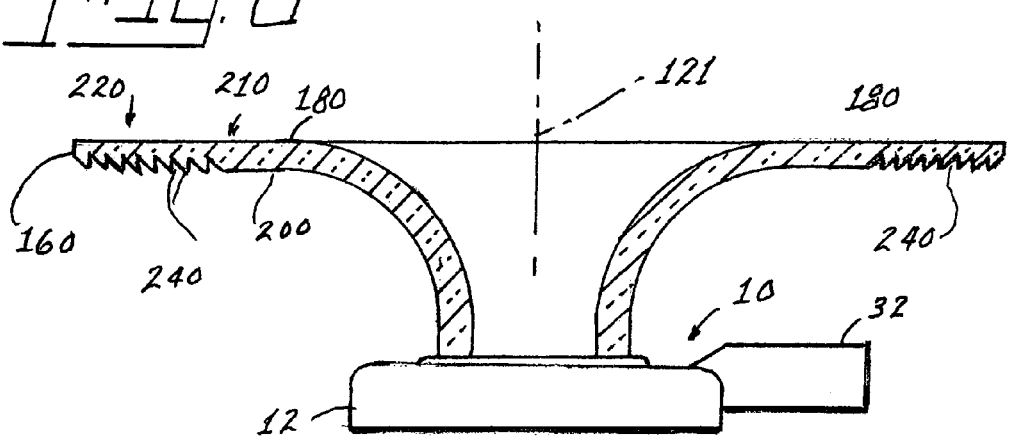
FIG. 9 is a sectional view taken along the line 9-9 of FIG. 8.

Yet another embodiment is shown in FIGS. 8 and 9 where the light transmissive body 120 comprises substantially a circular array formed as a body of rotation about the longitudinal axis 121

There is thus provided an optical light guide having wide variation in construction to suit specific design purposes. It is adaptable to many light sources but is uniquely adapted to replaceable LED light sources. The output regions can be varied to provide a multitude of light outputs that can be utilized with LED lamps of a stabilized design.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. An optical light guide comprising:
   a substantially rigid light transmissive body, said body comprising substantially a body of rotation about a longitudinal axis and having an input window, a distal end, a front side, and a rear side; said light transmissive body having a substantially smooth exterior surface on said front side and a substantially clear and solid interior, said input window transmitting light into said light transmissive body and extending substantially transverse to a longitudinal axis of a light emitting diode (LED) light source;
   said light transmissive body having a substantially constant thickness measured between said front side and said rear side, said light transmissive body extending way from said input window through an arc of from 60 to 120 degrees to an extension forming an output region extending towards said distal end;
   said rear side at least in said output region being formed with a plurality of reflective steps directing intercepted light towards the front side.

2. The optical light guide of claim 1 wherein said front side in said output region being formed with refractive features directing light received from the reflective steps in a desired direction.

3. The light guide of claim 1 wherein the light transmissive body extends through an arc of about 90 degrees.

4. The light guide of claim 1 wherein the extension of the output region comprises one third of the surface distance from the input window to the distal end.

5. The light guide of claim 1 wherein the distance from the input window to the distal end is more than 10 times the average thickness.

6. The light guide of claim 1 wherein at least one reflective step has a reflective surface oriented to direct light towards at least one respective refractive element formed on the front side.

7. An optical light guide comprising:
   a plurality of light guide fingers arrayed around a longitudinal axis, each finger having a rigid light transmissive member having an input window, a distal end, a front side, and a rear side; the light transmissive fingers having substantially smooth exterior surface and a substantially clear and solid interior;
   the input window transmitting input light into the light transmissive fingers, said input windows being sized and shaped to span at least one LED light source; said light transmissive fingers having a substantially constant thickness measured between the front side and the rear side, said light transmissive fingers extending way from said input windows through an arc of from 60 to 120 degrees to an output region extending towards said distal end;
   said rear side at least in the output region being formed with a plurality of reflective steps directing intercepted light towards said front side; and said front side in the output region being formed with refractive features directing light received from the reflective steps in a given direction, said respective output regions being aligned in a common plane.

8. The light guide of claim 7 wherein said fingers are arrayed in parallel rows.

9. The light guide of claim 7 wherein said fingers are equally spaced radially with respect to said longitudinal axis.

* * * * *